Nov. 18, 1969    R. E. MAXFIELD    3,478,721
BROODING AND GROWING CAGE
Filed May 19, 1967    3 Sheets-Sheet 1
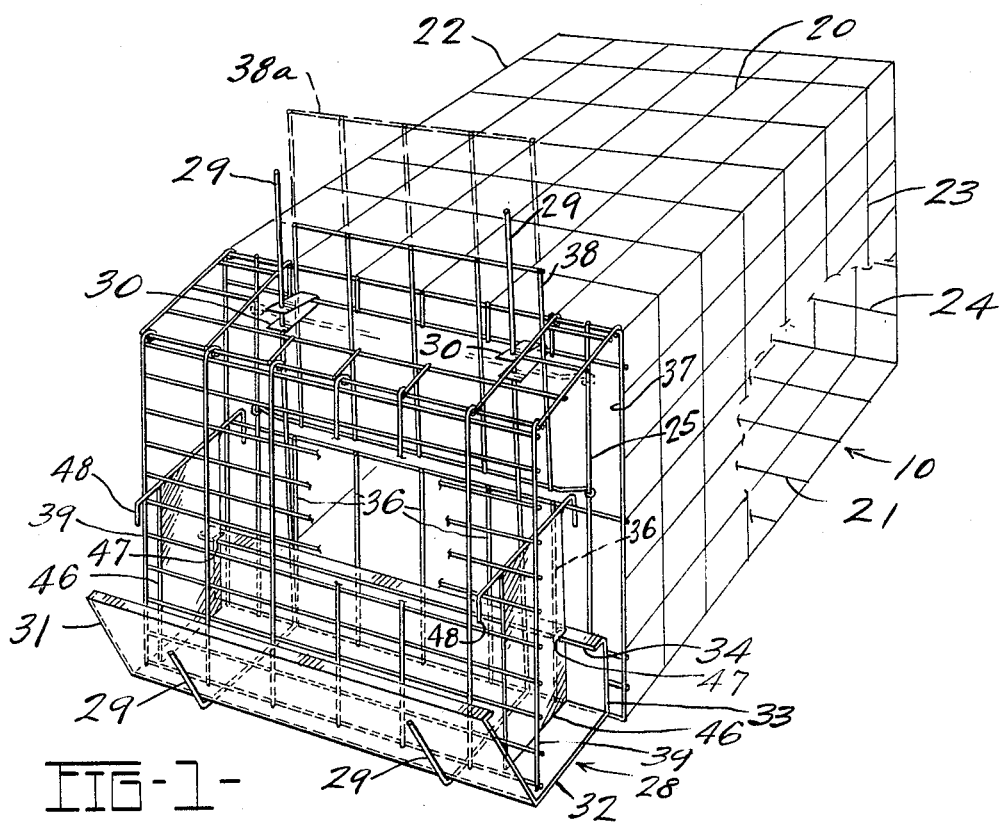
FIG-1-
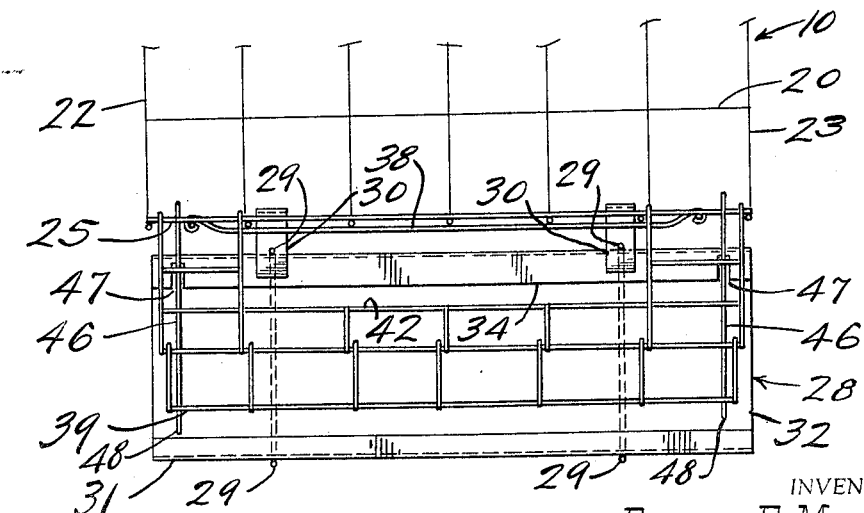
FIG-2-
INVENTOR:
ROBERT E. MAXFIELD.
BY
Owen & Owen
ATT'YS.

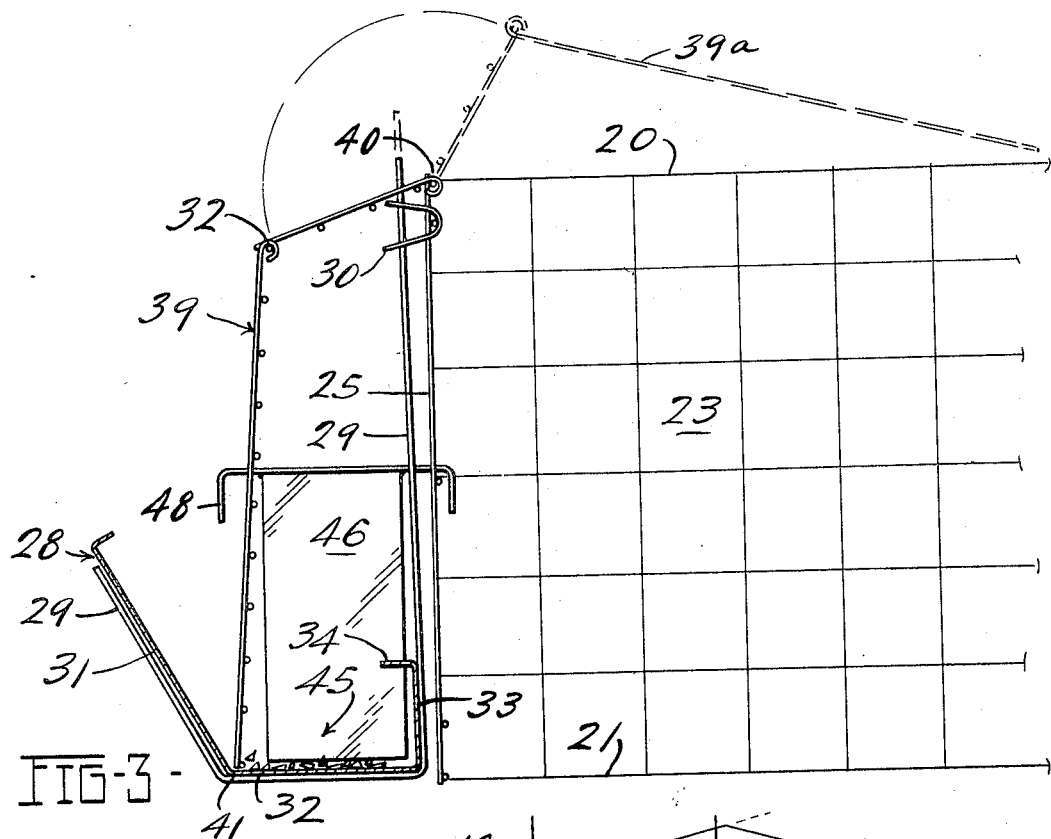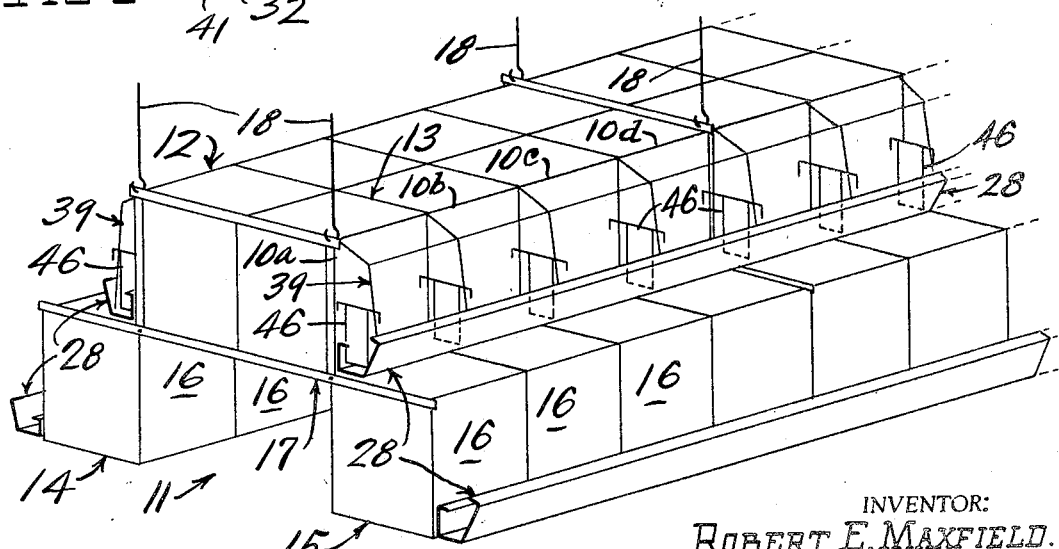

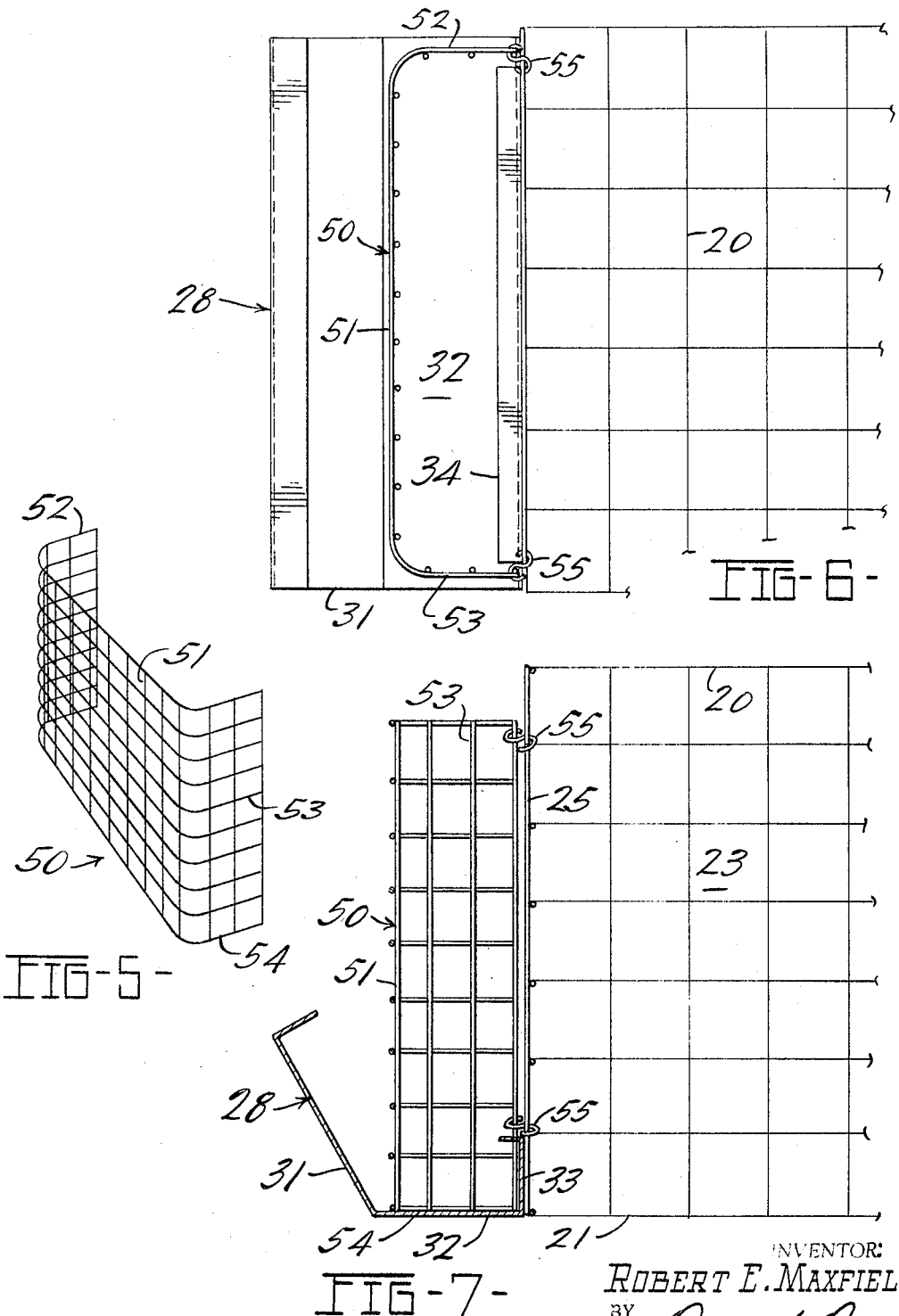

United States Patent Office 3,478,721
Patented Nov. 18, 1969

3,478,721
BROODING AND GROWING CAGE
Robert E. Maxfield, Hicksville, Ohio, assignor to The National Ideal Company, Hicksville, Ohio, a corporation of Ohio
Filed May 19, 1967, Ser. No. 639,890
Int. Cl. A01k *31/06*
U.S. Cl. 119—18          3 Claims

ABSTRACT OF THE DISCLOSURE

A brooding and growing cage for poultry, each cage module being rectangular and having a gate or door in one of its walls. A horizontal feed trough extends horizontally across the front of each cage module and the front cage wall has openings of a preselected size which allows small birds to enter the feed trough but prevents larger birds from entering. Guard means prevent the birds from leaving the trough. In one embodiment the guard means comprises a pivotally mounted barrier wall which extends outwardly from the cage and in one position engages the trough, preventing the smaller birds from leaving the feed trough other than through the front wall cage openings. In another embodiment the guard means comprises a guard screen having a front wall and two sidewalls. The guard screen is positioned in the feed trough adjacent the front cage wall.

BACKGROUND OF THE INVENTION

Large poultry operations have become more and more common in recent years. Poultry houses having controlled atmospheres and automated equipment, such as automated egg collection mechanisms, are known in the art. This type of poultry house often utilizes cage systems which house as many as twenty thousand birds.

While cage structures for laying birds have been developed, for examples, see U.S. Patents Nos. 2,882,857, 3,119,375, 3,208,430, and 3,225,741, a problem has remained unsolved in cage structures to be utilized by small growing birds. The feeding habits of day old birds are extremely different from ten week old birds. Prior art cage structures suitable for brooder birds simply were not suitable for larger birds. This created a serious problem in large scale commercial poultry operations.

SUMMARY OF THE INVENTION

The present invention solves the major problem of the prior art by providing a cage structure which is compatible for use with small brooder birds and is also suitable for larger growing birds. The present cage structure is, for example, suitable for the housing of chickens from one day of age to twenty weeks of age.

The brooding and growing cage, according to the present invention, is particularly adaptable to a large poultry operation where labor expenses are necessarily kept to a minimum. Each cage is generally rectangular in shape and is normally but one of a plurality of cage modules in a poultry cage system, for example, in either a multiple step cage system or a flat deck cage system.

Each of the brooding and growing cage modules has an upper and lower wall, opposed sidewalls, a back wall and a front wall. Gate means are provided in one of the walls, normally in the front wall. A horizontally extending feed trough is positioned adjacent the lower portion of the front wall. Normally, the feed trough serves a longitudinally extending row of brooding and growing cage modules. The feed trough has a back feeding wall portion, adjacent the front wall of the cage, and the feeding wall portion is of a predetermined height. In the embodiment described below, the predetermined height is the height required for the proper feeding of a ten week old bird. The front wall defines a plurality of openings of a preselected size, wherein a small bird may pass through the preselected openings and enter the feed trough while a larger bird is prevented by its size from passing through the openings.

An important feature of the invention is a guard means, which in one embodiment is a barrier wall which is movable to a first position adjacent the feed trough. In another embodiment the guard means is a guard screen positioned in the feed trough adjacent the front cage wall. Either embodiment prevents the small birds from leaving the feed trough other than through the openings in the front wall of the cage.

The present invention also contemplates a cage system, for example, a multiple step cage system wherein the upper rows of cages are brooder and growing cages, as described above, and the lower rows of cages are standard cages into which the birds are transferred after they reach a certain age and growth.

It is a primary object of the present invention to provide an improved cage structure particularly adapted for brooding and growing birds.

BRIEF DESCRIPTION OF THE DRAWINGS

FIG. 1 is a perspective view of a brooding and growing cage according to the present invention, with parts broken away to show preselected openings in the front cage wall and indicating by dashed lines an alternate position of a cage gate which is located in the front cage wall;

FIG. 2 is a fragmentary, top view of the cage structure shown in FIG. 1, drawn on an enlarged scale;

FIG. 3 is a fragmentary, side elevational view of the cage structure shown in FIG. 1, drawn on an enlarged scale and showing in dashed lines an alternative position of a chick guard member;

FIG. 4 is a fragmentary, perspective view of a multiple step cage system constructed according to the present invention;

FIG. 5 is a perspective view of another embodiment of guard means which prevents small birds from undesirably leaving the feed trough;

FIG. 6 is a fragmentary, top view similar to FIG. 2, however, showing a cage structure including the embodiment of the guard means shown in FIG. 5; and FIG. 7 is a fragmentary, side elevational view of the cage structure shown in FIG. 6.

DESCRIPTION OF THE PREFERRED EMBODIMENTS

A brooding and growing cage, according to the present invention is generally indicated in FIG. 1 by the reference number 10. While the cage 10 is illustrated as an individual cage, this cage structure is often utilized in a longitudinally extending row of cages, each cage comprising an individual cage module.

In row type structures, the adjacent cages often have common sidewalls. An example of this construction is illustrated in FIG. 4. A step cage system is generally indicated by the reference number 11. The step cage system 11 comprises two upper longitudinally extending cage rows 12 and 13, having a plurality of brooding and growing cage modules 10a, 10b, 10c, etc.

The step cage system 11 also includes lower growing cage rows 14 and 15. Each of the growing cage rows 14 and 15 comprises a plurality of standard growing cage modules 16. The step cage system 11 includes supporting framework, indicated by the reference number 17, which structurally interconnects the upper cage rows 12 and 13 and the lower growing cage rows 14 and 15. The entire step cage system 11 is elevated from the floor of the poultry house and is supported, for example, by hangers 18 which depend from the poultry house framework.

Referring to FIG. 1, the brooding and growing cage 10 (either an individual cage or a cage module), includes an upper wire mesh wall 20, a bottom wire mesh floor or wall 21, opposed wire mesh sidewalls 22 and 23, a wire mesh back wall 24, and a wire mesh front wall 25.

A horizontal, and longitudinally extending feed trough 28 is positioned adjacent the lower portion of the front wall 25. In the present embodiment, the feed trough 28 is supported by brackets 29 which are vertically adjustable and which are attached to the front wall 25 of the cage 10 by spring clips 30 (see FIG. 3).

In the present embodiment, the feed trough 28 includes an outwardly inclined front wall 31, a bottom 32, and a vertically extending feeding wall portion or back wall 33. The back wall 33 has a top edge 34 which is set at a predetermined height above the bottom wall 21 of the brooding and growing cage 10. In the present embodiment, the predetermined height is the height which is suitable for the feeding of approximately a ten week old bird which has been found to be two and one-quarter inches. The positioning of the feeding wall portion of the feeding trough 28 at a proper predetermined height is an important factor in the commercial operation of a cage system, for example, the step cage system 11 illustrated in FIG. 4. The positioning determines to some extent the feeding rate of the birds and also limits undesired feed waste which results when the feed is pushed out of the confines of the feed trough 28.

In the preferred embodiment shown, the upper wall 20 has one inch by two inch wire mesh openings. The upper part of the back wall 24 has one by two inch wire mesh openings, while the lower portion of the back wall 24 has one inch by one inch wire mesh openings. The sidewalls 22 and the bottom wall 21 preferably have one inch by one inch mesh openings.

The front wall 25 has a plurality of openings 36 (see FIG. 1) of a preselected size. In the present embodiment, the preselected openings 36 are four inches high and one and one-half inches wide. The preselected openings 36 are located in a row immediately adjacent the top edge 34 of the feed trough 28. It has been found that the preselected openings 36 enable birds to pass through such openings 36 when they are between the ages of one day and three weeks. At the age of approximately three weeks, the birds have grown to a size such that they can no longer pass through the openings 36 and are therefore confined to the cage 10. It should be noted that the dimensions stated above relate to one embodiment of the present invention and, of course, other dimensions are equally suitable when using other embodiments of the present invention.

The front wall 25 has a second row of openings 37 located immediately above the row of preselected openings 36. In the present embodiment the openings 37 are one and one-half inches wide and five inches high. A vertically movable gate 38 is located in the center of the upper row and is movable between the closed position shown in solid lines in FIG. 1 and an open position indicated by the dashed lines designated 38a. The vertically movable gate 38 is used to remove or introduce birds and is also utilized for cleaning purposes.

Referring to FIG. 3, one embodiment of guard means according to the invention comprises a guard member 39 having an upper end 40 and a lower end 41. The guard member 39 is pivotally mounted adjacent the front wall 25. In the present embodiment, the upper end is pivotally mounted at the line of intersection of the upper wall 20 and the front wall 25. The member 39 also includes an intermediate horizontally extending pivot 32 in the present embodiment. The guard member 39 is movable between a first position shown in solid lines in FIG. 3 wherein the lower end 41 is adjacent the feed trough 28 and a second position, designated 39a, wherein the lower end 41 is moved into contacting relationship with the upper wall 20 of the cage 10 and the entire guard member 39 overlies the upper wall 20.

In the first position, the guard member 39 serves as a chick guard to prevent the small birds from jumping over the outwardly inclined wall 31 of the feed trough 28. During feeding, the small birds, between the ages of one day and three weeks, pass through the preselected openings 36 in the front wall 25 directly into the feeding trough 28 which contains feed, indicated by the reference number 45 in FIG. 3. The guard member 39 includes a recessed opening 42 (see FIG. 2) which provides clearance for the guard member 39 with respect to the upper end of the gate 38 as the guard member 39 is moved to the position 39a shown in FIG. 3.

Referring to FIGS. 1 and 3, in the present embodiment, barrier means comprising removable partitions 46 are positioned at preselected positions along the feed trough 28. The partitions 46 are received in slots 47 located in the top edge 34 of the feed trough 28. The partitions 46 have U-shaped support members 48 at their upper ends which extend outwardly and engage portions of the front wall 25 and the guard member 39. The partitions 46 restrict the movement of the small birds along the longitudinal centerline of the feed trough 28 and prevent the congregating of the birds within one particular portion of the feed trough 28. Of course, many types of barrier means may be provided other than the particular embodiment described above.

Referring to FIGS. 5, 6 and 7, a second embodiment of guard means is shown. A guard screen is generally indicated by the reference number 50. The guard screen 50 has a generally C shaped horizontal cross section and includes a front screen wall 51, a side screen wall 52, a side screen wall 53 and a bottom edge 54.

The guard screen 50 is self supporting, with the bottom edge 54 resting on the bottom 32 of the feed trough 28. If desired, removable retaining clips 55 may be used to connect the side screen walls 52 and 53 to the front cage wall 25, as shown in FIG. 7.

The front screen wall 51 prevents small birds from jumping over the inclined wall 31 of the feed trough 28, while the side screen walls 52 and 53 serve as barrier means to prevent the birds from running along the longitudinal centerline of the feed trough 28.

Referring to FIG. 4, the step cage system 11 is particularly adaptable for the commercial growing of poultry, for example, laying hens. The cage modules 10a, 10b, 10c, 10d, etc., are preferably twenty inches deep, twenty-four inches across the front, and twelve inches high. A cage of this size holds approximately twenty birds. During the first three weeks, the small birds pass through the preselected openings 36 and move directly into the trough 28 to feed, as described above. After three weeks, the birds, which are still in the brooder category, can no longer pass through the preselected openings 36 and at that time, they begin to feed from positions within the cake 10. At the age of ten weeks, when utilizing the step cage system 11, the birds are moved from the upper cage rows 12 and 13 into the lower growing cage rows 14 and 15. The birds remain in the growing cages for an additional ten weeks and then are moved to laying cages (not shown).

After the birds are moved from the upper cage rows 12 and 13 to the lower growing cage rows 14 and 15, new day old birds are placed in the upper cage rows 12 and 13 and the cycle is repeated.

If desired, the birds can be kept in the brooding and growing cage 10 until they reach the desired age of twenty weeks. However, it has been found that the step cage system 11 which is described above is very suitable for high production purposes.

While the present invention has been disclosed in connection with a specific arrangement of parts and with respect to a preferred embodiment, it should be expressly understood that numerous modifications and changes may be made without departing from the scope of the inventive concept.

What is claimed is:

1. A brooding and growing cage for chickens comprising, in combination, upper and lower wire mesh walls, opposed wire mesh sidewalls, a wire mesh back wall, a wire mesh front wall in opposed reaction to said back wall, gate means in said front wall, said gate means including a vertically movable gate member, a vertically adjustable feed trough adjacent said front wall said trough including a feeding wall portion adjacent said front wall, said feeding wall portion having its upper edge positioned at a predetermined height above said bottom wall, said wire mesh front wall defining immediately adjacent said trough a plurality of openings of a preselected size, whereby small birds can use such openings for ingress and egress into said feed trough and larger birds cannot pass through such openings, partition means for preventing the movement of the birds in said trough in a direction parallel to the longitudinal centerline of said trough, and guard means attached to the upper portion of said front wall and mounted adjacent said trough for preventing such birds from leaving said trough other than through such preselected openings.

2. A brooding and growing cage according to claim 1, wherein said guard means comprises a pivotally mounted guard member movable between an operative position wherein a lower end of said guard member is adjacent said feed trough and an inoperative position wherein the lower end of said guard member is spaced from said feed trough, said guard member including an upper section which is pivotally connected adjacent the upper end of said front wall and a lower section which is pivotally connected to the lower end of said upper section.

3. A brooder and growing cage according to claim 1 wherein said guard means and said partition means comprises a guard screen, having a vertical front screen wall, and opposed vertical side screen walls extending from said front screen wall rearwardly to said wire mesh front wall, and a plurality of clips for attaching said guard screen to said wire mesh front wall.

References Cited

UNITED STATES PATENTS

| | | | |
|---|---|---|---|
| 1,212,289 | 1/1917 | Van Ackeren | 119—21 |
| 1,918,125 | 7/1933 | Petersime | 119—17 X |
| 2,015,925 | 10/1935 | De Wolf | 119—61 X |
| 2,237,557 | 4/1941 | Hoeft | 119—31 |
| 2,292,981 | 8/1942 | Willett et al. | 119—33 |
| 2,863,418 | 12/1958 | Pockman | 119—18 |

HUGH R. CHAMBLEE, Primary Examiner

U.S. Cl. X.R.

119—17, 61

PO-1050
(5/69)

UNITED STATES PATENT OFFICE
CERTIFICATE OF CORRECTION

Patent No. 3,478,721                     Dated  November 18, 1969

Inventor(s) Robert E. Maxfield

It is certified that error appears in the above-identified patent and that said Letters Patent are hereby corrected as shown below:

Column 4, line 58, "cake" should be corrected to read --cage--.
Column 5, line 8, "reaction" should be corrected to read --relation--; and
line 11, insert a comma --,-- between the words "wall" and "said".

SIGNED AND
SEALED
JUN 2 1970

(SEAL)
Attest:

Edward M. Fletcher, Jr.
Attesting Officer

Commissioner of Patents